US006947403B2

(12) United States Patent
Heikkila et al.

(10) Patent No.: US 6,947,403 B2
(45) Date of Patent: Sep. 20, 2005

(54) ADVANCED WHITENER-RAKE RECEIVER FOR WCDMA TERMINAL

(75) Inventors: Markku J. Heikkila, Oulu (FI); Jorma Lilleberg, Oulu (FI)

(73) Assignee: Nokia Corporation, Espoo (FI)

( * ) Notice: Subject to any disclaimer, the term of this patent is extended or adjusted under 35 U.S.C. 154(b) by 34 days.

(21) Appl. No.: 10/607,670

(22) Filed: Jun. 27, 2003

(65) Prior Publication Data

US 2004/0264417 A1 Dec. 30, 2004

(51) Int. Cl.[7] .............................................. H04B 7/216
(52) U.S. Cl. ........................ 370/335; 370/342; 370/310
(58) Field of Search ................................ 370/335, 342, 370/310

(56) References Cited

U.S. PATENT DOCUMENTS

| 5,937,014 A | * | 8/1999 | Pelin et al. ................. 375/340 |
| 6,470,044 B1 | * | 10/2002 | Kowalski ..................... 375/148 |
| 6,654,365 B1 | * | 11/2003 | Sylvester et al. ........... 370/342 |

FOREIGN PATENT DOCUMENTS

| WO | WO-01/39448 A1 | 5/2001 |
| WO | WO-02/075950 A1 | 9/2002 |

OTHER PUBLICATIONS

J. Vidal, M. Cabrera, A. Agustin, "Space–Time Front–Ends for RAKE Receivers in the FDD Mode of UTRA", Universitat Politecnica de Catalunya, Barcelona, Spain.

Hafez Hadinejad–Mahram and Gholamrez Alirezaei, "A Linear Receiver for WCDMA Downlink Exploiting the Coloration of the Interference", Aachen University, Aachen, Germany, 2003 IEEE.

* cited by examiner

Primary Examiner—Huy D. Vu
Assistant Examiner—Cynthia L. Davis
(74) Attorney, Agent, or Firm—Harrington & Smith, LLP (57) ABSTRACT

A CDMA receiver (10) includes a receiver input for coupling to signal outputs of $N_{rx}$ receive antennas (20A,20B), where the signal outputs are sampled at $N_s$ samples per symbol or chip, a matched filter (14), such as a RAKE, and a whitening filter (20) for coupling the receiver input to an input of the matched filter. The whitening filter contains $N_s N_{rx}$ parallel whitening filters $w_{j,k}$ (22A–22D), individual ones of the whitening filters $w_{j,k}$ receiving during each symbol interval i, $N_s N_{rx}$ new signal samples via a signal connection matrix (28) such that a first individual whitening filter receives only one of the new samples, a second individual whitening filter receives the same sample as the first individual whitening filter, and one additional sample, and such that an nth individual whitening filter receives the same n–1 samples as the first n–1 individual whitening filters, plus one of the remaining samples. The whitening filter has $N_{rx}$ outputs for outputting filtered signal samples such that a filtered signal sample appearing in the $N_{rx}$ outputs does not correlate with any other filtered signal sample appearing in $N_{rx}$ outputs. The whitening filter also includes a delay line (30) constructed as a plurality of serially coupled delay line elements each having a delay of one symbol interval. The delay line has an input coupled to an output of said signal connection matrix and provides the $N_s N_{rx}$ parallel whitening filters $w_{j,k}$ with delayed versions of the signal samples.

24 Claims, 5 Drawing Sheets

ADVANCED WHITENER-RAKE RECEIVER FOR WCDMA TERMINAL

TECHNICAL FIELD

This invention relates generally to wireless (radio frequency) receivers and, more specifically, relates to code division, multiple access (CDMA) receivers that employ a matched filter (MF) in baseband (BB) circuitry.

BACKGROUND

Signal whitening is a known type of signal processing task in many applications, and is a process whereby correlated or "colored" frequency components of a signal of interest are made to appear more like random (white) noise. While this invention is focused on wideband CDMA (WCDMA) systems, signal whitening can be used in other types of systems as well.

It is known that a whitening operation can improve the performance of a receiver. For example, a maximum-likelihood (ML)-based channel equalizer normally assumes that additive noise-plus-interference is white, i.e. its spectrum is flat and samples of the noise-plus-interference do not correlate with each other. If this is not the case (i.e., the noise if "colored"), some performance degradation can be expected. Whitening can also be implicitly performed by a linear minimum mean-square error (LMMSE) equalizer and, hence, the whitening operation can be applied to realize a linear equalizer. Linear equalizers are known to offer performance improvement in many radio communication applications.

The use of multiple antennas and/or oversampling in the receiver are also known to offer a performance improvement, as compared to using only a single receive antenna without oversampling.

WO 02/075950, "Interference rejection in a receiver" and WO 01/39448, "Methods, receiver devices and systems for whitening a signal disturbance in a communication signal", each describe the use of a whitening filter in a CDMA system. WO 02/075950 and WO 01/39448 each describe a receiver where a whitening operation precedes other signal processing tasks, such as matched filtering and data symbol detection.

WO 01/39448 does not disclose a specific method to process an over-sampled or other signal in the case where multiple receive antennas are present It should also be noted that in WO 01/39448 it is desired to whiten the additive noise-plus-interference signal, and not the total signal (including both the desired and interfering signals).

On the other hand, WO 02/075950 seeks to whiten the total signal, but concentrates on spatial domain processing and not the time domain. WO 02/075950 also uses block processing of the input signal, i.e., a block or a vector of signal samples is processed simultaneously using multiplication by a whitening matrix. For example, given a signal of N samples, the whitening matrix is an N-by-N matrix that is obtained by Cholesky factorizing the signal covariance matrix. However, should one wish to address time domain signal whitening, in addition to spatial domain signal whitening, the whitening matrix may prove to be impractically large for most real-world applications.

Also representative of the prior art is a publication by Vidal et al. "Space-time front-ends for RAKE receivers in the FDD mode of UTRA", Signal Theory and Communications Department, Universitat Politécnica de Catalunya, Barcelona, Spain (2000). FIG. 3 of this publication shows a temporal whitening block followed by a spatial whitening matrix feeding a plurality of RAKE receivers. The approach of Vidal et al., however, is to whiten the additional noise-plus-interference, and not the total received signal, and leads to the use of a maximum likelihood detector. Vidal et al. apply block processing of the signal (i.e., a matrix multiplication based operation) having the same disadvantages as explained above. Vidal et al. simplify the block whitening operation by separating temporal and spatial (noise) whitening, which is optimal only with certain assumptions as they describe. Vidal et al. state that the separated temporal (noise) whitening can be implemented by a FIR filter if a $p^{th}$ order Markov model is applied for temporal noise correlation, and they also point out the sub-optimality and limitations of this approach.

One of the main advantages of CDMA systems is the capability of using signals that arrive in the receiver with different time delays (multipath signals). Due to its wide bandwidth, and the use of multi-finger RAKE receiver, a CDMA receiver uses the multipath signals and combines them to provide a stronger. The RAKE receiver is essentially a set of receivers. For example, one of the receivers (each is typically referred to as a finger) searches for different multipaths and feeds the information to the other fingers. Each finger then demodulates the received signal corresponding to a strong multipath. The results of each finger are then combined together to yield a stronger signal.

The RAKE may be considered to be a filter that is matched to the operations of dispreading the received spread signal, pulse shape filtering and channel filtering. Such a matched filter maximizes the Signal-to-Interference-plus-Noise Ratio (SINR) at its output, if the interference plus noise is white.

The conventional RAKE does not operate to suppress the intra-cell and inter-cell interference. However, channel equalizers that are currently under study take into account both sources of interference.

Other problems associated with conventional CDMA RAKE receivers include a general inability to detect higher performance, higher order modulation schemes (e.g., 16-QAM) in multipath channels with high interference levels, and a requirement, during soft handover, that each base station signal to be detected have its own channel equalizer. Problems also arise during the equalization of space-time coded signals (e.g., during the reception of STTD transmissions). A problem also arises in multi-antenna systems, in that each transmit antenna requires its own equalizer at the receiver.

SUMMARY OF THE PREFERRED EMBODIMENTS

The foregoing and other problems are overcome, and other advantages are realized, in accordance with the presently preferred embodiments of these teachings.

The invention is directed towards baseband signal processing algorithms in a WCDMA terminal receiver. The invention improves the performance of a conventional RAKE receiver by transforming it into an advanced equalization-based receiver.

The invention suppresses multiple access interference limiting the performance and system capacity in the downlink of CDMA-based systems, and converts a conventional RAKE receiver into a linear (minimum mean-square error) channel equalizer, where the required filter before the RAKE has a minimum number of filter taps to be solved.

The invention further converts a multi-antenna RAKE receiver into a multi-antenna space-time equalizer by performing optimal beam-forming automatically, and further effectively suppresses inter-cell interference.

This invention also converts a conventional channel estimator to a maximum likelihood estimator (MLE), thus improving channel estimation.

The use of this invention also makes it possible to employ higher-order modulation (e.g. 16-QAM) in, for example, high-speed downlink packet access (HSDPA) systems. A conventional RAKE receiver, by contrast, cannot detect such modulation schemes in multipath channels with high interference levels.

Two suitable examples of methods of implementing the whitening filter are disclosed as an adaptive method and as a direct method.

The use of this invention also solves the problem faced in soft handover, in which each BS signal to be detected requires its own channel equalizer. In accordance with an aspect of this invention the same whitening filter in front of the RAKE receiver can be used at all times, and remain unchanged regardless of which BS signal(s) are to be detected.

The use of this invention also solves the problem that arises during the equalization of space-time coded signals (e.g., during the reception of STTD transmissions).

The use of this invention furthermore overcomes the problem that each transmit antenna requires its own equalizer at the receiver. In accordance with an aspect of this invention, and similar to the soft handover case, the same whitening filter before the RAKE receiver results in an optimal linear (single-user) receiver.

An important benefit that is realized by the use of this invention is a significant performance gain. The improved performance gain can be used to improve the system capacity, the cell coverage and/or the user data rate (e.g., in HSDPA systems).

This invention can be implemented in digital baseband circuitry by the addition of the whitening filter in front of the RAKE. Much of the functionality of the RAKE can remain unchanged, as compared to how it is implemented currently.

In a manner that differs from the prior art, such as the Vidal et al. publication referenced above, this invention provides for a full joint whitening operation of the total received signal, both in the temporal and spatial domains, and without requiring block/matrix operations. In addition, in contradistinction to the use of only the maximum likelihood detector approach, this invention more generally applies to, for example, linear minimum mean square error detection.

This invention provides methods and apparatus to implement a functional block of a receiver that beneficially whitens the signal both in the time and spatial domain in a case where there are multiple receive antennas and/or in the case where oversampling has been applied. Oversampling in this context can be taken to mean that multiple samples of a single symbol interval or a single chip interval (e.g., in WCDMA) are taken such that, for example, the Nyqvist sampling criterion is satisfied. One benefit that is realized by the use of this invention is that only a relatively small number of whitening filters are required due to the preferred parallel filtering approach, and due to a preferred signal connection matrix.

As was noted above, the use of multiple antennas and/or oversampling is known to offer a receiver performance improvement, as compared to using only a single receive antenna without oversampling. This invention thus facilitates the use of more than one receive antenna, as well as the use of oversampling, in a CDMA receiver. In addition, computationally advantageous techniques to implement the whitening filters are described, more specifically, to implement a time domain and a spatial domain whitening receiver front-end.

In accordance with this invention a CDMA receiver includes a receiver input for coupling to signal outputs of $N_{rx}$ receive antennas, where the signal outputs are sampled at $N_s$ samples per symbol or chip, a matched filter, and a whitening filter for coupling the receiver input to an input of the matched filter. The whitening filter contains $N_s N_{rx}$ parallel whitening filters $w_{j,k}$, individual ones of the whitening filters $w_{j,k}$ receiving during each symbol interval i, $N_s N_{rx}$ new signal samples via a signal connection matrix such that a first individual whitening filter receives only one of the new samples, a second individual whitening filter receives the same sample as the first individual whitening filter, and one additional sample, and such that an nth individual whitening filter receives the same n−1 samples as the first n−1 individual whitening filters, plus one of the remaining samples. The whitening filter has $N_{rx}$ outputs for outputting filtered signal samples such that a filtered signal sample appearing in the $N_{rx}$ outputs does not correlate with any other filtered signal sample appearing in $N_{rx}$ outputs.

The whitening filter also includes a delay line constructed as a plurality of serially coupled delay line elements having, in general, a number of delay line stages that is a function of the delay spread. For example, the time span of the delay may be about twice the channel delay spread, yielding about (2*delay spread)/T delay line stages. Each delay line stage may have a delay of one chip or symbol interval. The delay line has an input coupled to an output of said signal connection matrix and provides the $N_s N_{rx}$ parallel whitening filters $w_{j,k}$ with delayed versions of said signal samples.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
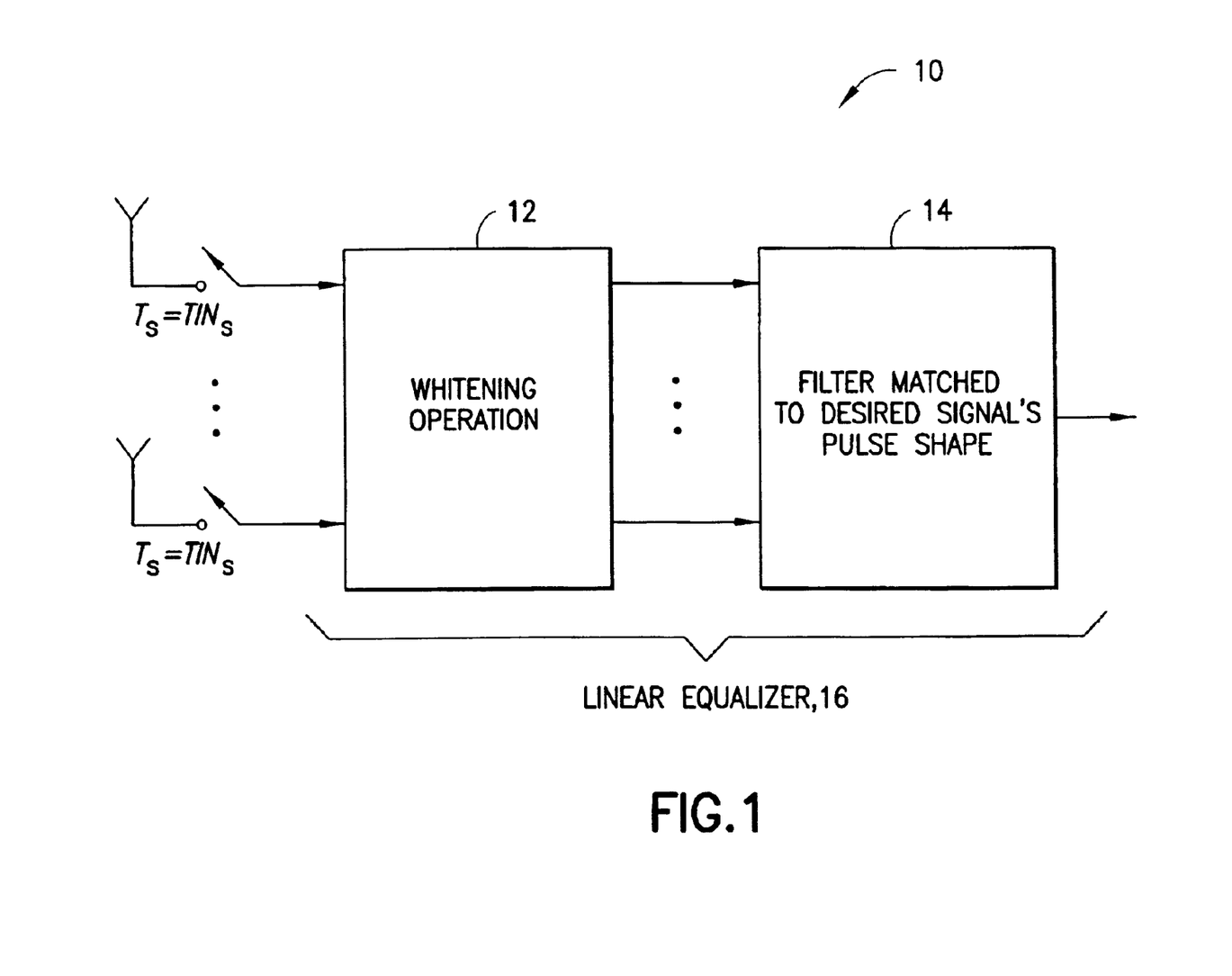
FIG. 1 is block diagram of a CDMA receiver that includes multiple antenna, a matched filter (e.g., a RAKE) and a whitening operation block interposed between the antennas and the matched filter.

By way of introduction, FIG. 1 shows the basic structure of a multi-antenna receiver 10 in which signal whitening can be used to benefit the reception process. The majority of the RF components are not shown in order to simplify the drawing, and only the baseband-related functional blocks are shown. In this framework, a whitening block 12 is followed by a filter 14 that is matched to the pulse shape of the desired signal in the output signal(s) of the whitening block 12. The term $N_s$ denotes the number of samples per symbol or chip, T is the delay of one symbol (or chip) interval, and $T_s$ is the sample interval.

It is pointed out that in a presently preferred CDMA embodiment this invention operates at the chip level. However, this invention is not limited for use only in CDMA systems, and that in other types of systems, such as a TDMA system, the invention may operate at the symbol level.

It is also pointed out that while this invention is described primarily in the context of a WCDMA downlink, in other embodiments it may be used in the uplink as well, or only in the uplink, however the overall benefit will not be as great.

The whitening block 12 and the matched filter 14 together form a linear equalizer 16 that can be used, for example, to suppress the detrimental effects of multipath propagation in WCDMA systems. Other types of signal processing applications can also follow the whitening operation. The general architectural form of a matched filter preceded by a whitening filter is known.

Figure 2:
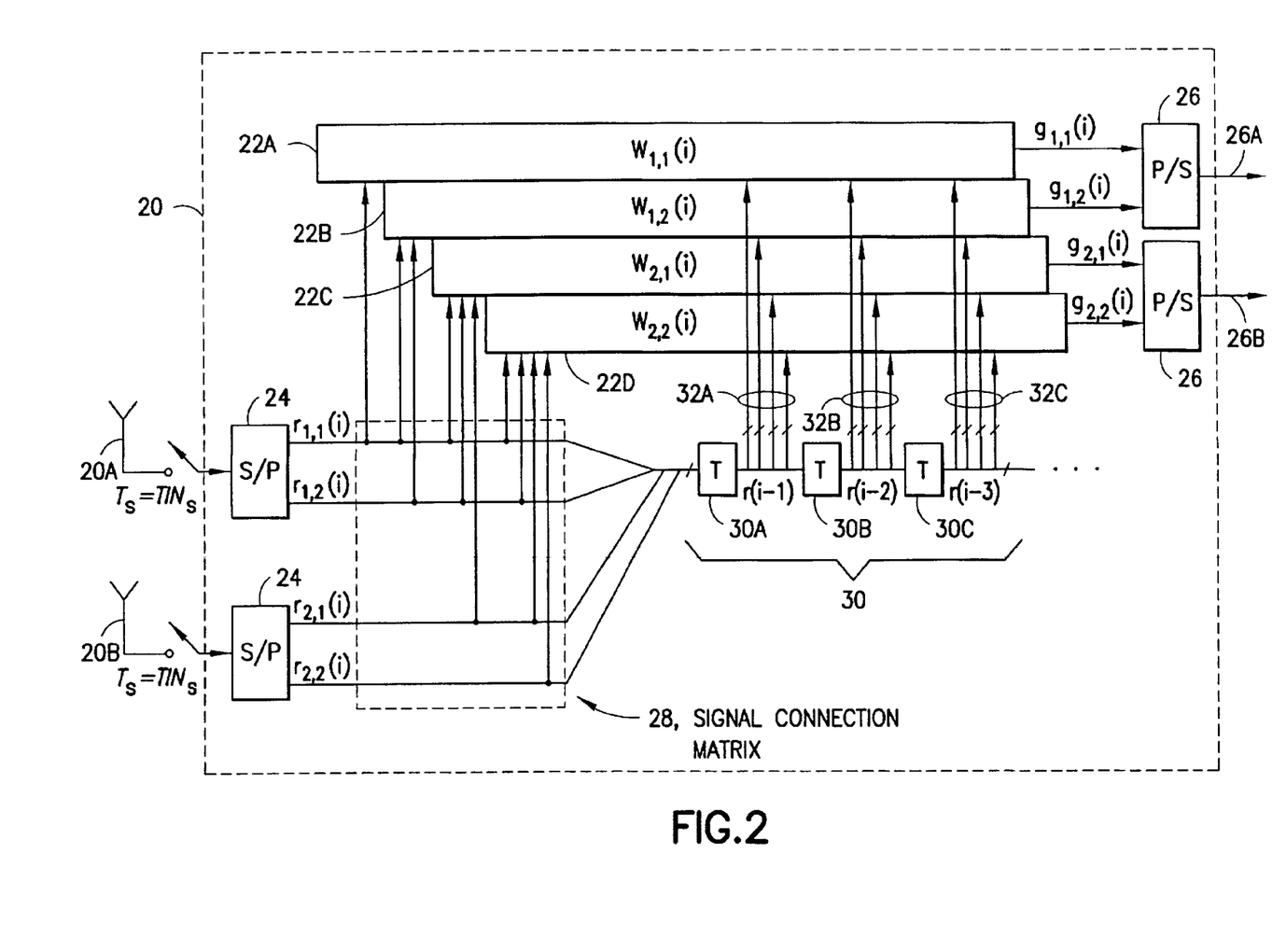
FIG. 2 is a block diagram of the whitening block of FIG. 1 in accordance with this invention.

FIG. 2 shows a presently preferred embodiment of the receiver 10 front-end structure that includes a whitening filter 20 that performs signal whitening both in the time domain and in the spatial domain. In this embodiment two receive antennas 20A and 20B ($N_{rx}$=2) and two samples per symbol or chip ($N_s$=2) have been assumed for convenience, although this invention is not limited to only these two specific assumptions. The S/P blocks 24 are serial-to-parallel converters having $N_s$ outputs, and the P/S blocks 26 are parallel-to-serial converters having $N_s$ inputs and one output each, forming whitening filter outputs 26A, 26B. An important aspect is the utilization of multiple ($N_s N_{rx}$=4 in this example) parallel whitening filters $w_{j,k}$ 22A–22D.

A desired result of the operation of the whitening filters 22A–22D and related circuitry is that any signal sample appearing in the two outputs 26A, 26B does not correlate with any other sample appearing in either of the two outputs 26A, 26B. This is accomplished by using the $N_s N_{rx}$ parallel whitening filters 22A–22D and a signal connection matrix 28. It should be noted that there are other possible signal connection matrices 28 that can be used. In this embodiment, $N_s$ is the number of samples per symbol (or chip) and $N_{rx}$ is the number of receive antennas 20A, 20B. $N_{rx}$ may also denote the number of signals obtained by using multiple receiver antenna beams. As in the embodiment of FIG. 1, T is the delay of one symbol (or chip) interval, and $T_s$ is the sample interval. A plurality of serially connected delay elements (T) 30A, 30B, 30C form a delay line 30 for receiving the outputs of the S/P converters 24 and for outputting delayed signal samples over buses 32A, 32B and 32C, respectively, to the $N_s N_{rx}$ parallel whitening filters 22A–22D. In general, the number of elements or stages in the delay line 30 is a function of the delay spread. For example, the time span of the delay may be about twice the channel delay spread, yielding about (2*delay spread)/T delay line stages.

In operation, and during each chip (or symbol) interval i, $N_s N_{rx}$ new signal samples are generated. These samples are input to the $N_s N_{rx}$ parallel whitening filters 22A–22D via the S/P converters 24 and signal connection matrix 28 so that the $1^{st}$ filter 22A receives only one of the new samples, the $2^{nd}$ filter 22B receives the same sample as the $1^{st}$ filter 22A and one additional sample. Similarly, nth filter (22D in this case) receives the same n−1 samples as the earlier n−1 filters, plus one of the remaining samples.

The number of whitening filter 20 output signals 26A, 26B is the same as the number of receive antennas 20A, 20B. The sampling rate at each of the $N_{rx}$ whitening filter 20 output signals 26A, 26B is also the same as the input signal sampling rate (i.e., $N_s$ samples per symbol). The output signals 26A, 26B can be directly fed to a conventional $N_{rx}$-antenna matched filter receiver 14 (such as an $N_{rx}$-antenna RAKE in a WCDMA embodiment). By performing the pre-whitening operation in the whitening filter 20 a conventional receiver is transformed into an optimal linear single-antenna channel equalizer, or to optimal linear multi-antenna space-time equalizer (in a minimum mean-square error sense). Thus, when the whitening filter 20 of this invention is used in conjunction with a multi-antenna RAKE (with or without oversampling), the receiver 10 automatically performs optimal beamforming, taking into account the directional interference from neighboring base stations, while it also suppresses the multiple access interference due to a multipath channel. Note that while users in a CDMA system are allocated orthogonal spreading codes, the orthogonality is impaired by a multipath channel that causes interference between the users. The channel equalization provided by the use of the whitening filter 20 serves to restore the user orthogonality.

A property of the receiver 10 is that the whitening filter 20 may remain the same regardless of which base station signal is to be detected, e.g., in the case of soft handover in WCDMA. Only the matched filter part of the receiver 10 needs be modified to detect the desired signals, while the front-end whitening filter 20 is always optimal, regardless of which base station signal is to be detected.

An important benefit of using the structure shown in FIG. 2 is that block processing of the signal is not required, as in the prior art discussed above, but instead it is possible to time-continuously operate the filter 20 in order to process indefinitely long signal vectors. While conventional block processing does whiten the signal, it does not guarantee the desired response when output samples in consecutive signal blocks are considered. To overcome this limitation of block processing, a large, and inefficient, whitening filter matrix would be required.

A discussion of the details of the operation of the whitening filter 20 is now provided.

Assume a set of parameters as in FIG. 2. The signal vectors in the delay line elements 30A, 30B and 30C of FIG. 2 can thus be defined as:

$$r(i-1) = \begin{pmatrix} r_{1,1}(i-1) \\ r_{1,2}(i-1) \\ r_{2,1}(i-1) \\ r_{2,2}(i-1) \end{pmatrix}.$$

In the term $r_{n,m}(i)$ symbol n and m denote an antenna and a chip sample index, respectively. Assuming that the input signal vector for an arbitrary filter $w_{n,m}$ is denoted by $r_{n,m}$, then the signal connection matrix 28 shown in FIG. 2 results in input signal vectors:

$$r_{1,1}(i) = \begin{pmatrix} \vdots \\ r(i-2) \\ r(i-1) \\ r_{1,1}(i) \end{pmatrix}; \quad r_{1,2}(i) = \begin{pmatrix} \vdots \\ r(i-2) \\ r(i-1) \\ r_{1,1}(i) \\ r_{1,2}(i) \end{pmatrix}; \quad r_{2,1}(i) = \begin{pmatrix} \vdots \\ r(i-2) \\ r(i-1) \\ r_{1,1}(i) \\ r_{1,2}(i) \\ r_{2,1}(i) \end{pmatrix}; \quad (1)$$

$$r_{2,2}(i) = \begin{pmatrix} \vdots \\ r(i-2) \\ r(i-1) \\ r(i) \end{pmatrix}$$

at the inputs to the whitening filters 22A, 22B, 22C and 22D.

a) Direct Form Solution

Taking one of the signal vectors in Equation (1), one may write its signal model as $$r_{n,m}(i) = Gb + n = \begin{pmatrix} H \\ h^T \end{pmatrix} b + n,$$

where $(\cdot)^T$ denotes transposition, G is a channel matrix, possibly including the effect of transmitter and receiver filters, b is a symbol vector and n a noise vector. Vector $h^T$ is the bottom row of G. The corresponding whitening filter 20 output is then $$g_{n,m}(i) = w_{n,m}^H(i) r_{n,m}(i),$$

where $(\cdot)^H$ denotes conjugate transposition. A particular whitening filter 20A–20D can be obtained by using linear minimum mean-square error (LMMSE) criterion as $$w_{n,m}(i) = \begin{pmatrix} -\alpha C_{n,m}^{-1} H h^* \\ 1 \end{pmatrix} = \begin{pmatrix} -u_{n,m} \\ 1 \end{pmatrix}$$

in which $(\cdot)^{-1}$ denotes matrix inversion and $(\cdot)^*$ complex conjugation. Symbol $\alpha$ is a real scaling factor, and the covariance matrix of $r_{n,m}(i)$ is $$C_{n,m} = \text{Expectation}\{\tilde{r}_{n,m}(i)\tilde{r}_{n,m}^H(i)\}.$$

The tilde above vector $r_{n,m}(i)$ denotes an operation where the bottom element of the original vector is excluded. The individual whitening filters 20A–20D that comprise the whitening filter 20 may thus take the form of prediction error filters, which are known to possess whitening capability. It should also be noted that here the total signal covariance matrix has been applied, i.e., the applied signal includes also the desired signal component. Depending on the application, the desired signal part may be excluded, and in this case only a noise-plus-interference covariance matrix can be used.

b) Adaptive Whitening Filter Computation

This invention also encompasses the use of a LMS (least mean square) adaptation to determine the whitening filter 20. By using the above notation one may update the unfixed part of the whitener as:

$$u_{n,m} \leftarrow u_{n,m} + \mu\{g_{n,m}^*(i)\tilde{r}_{n,m}(i)\},$$

where parameter $\mu$ is a small step size factor. Again, the tilde above vector $r_{n,m}(i)$ denotes the operation where the bottom element of the original vector is excluded.

c) Lattice Filtering Based Whitening

Figure 3:
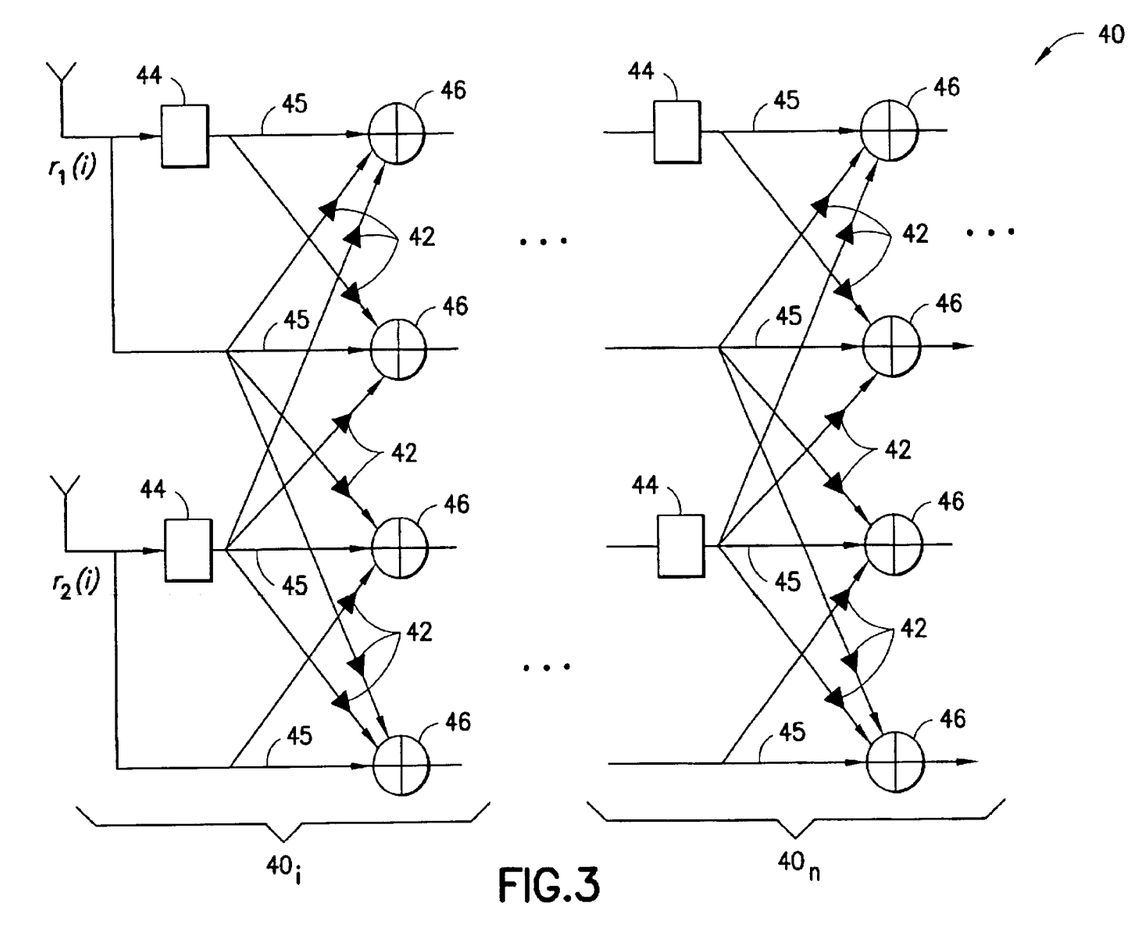
FIG. 3 illustrates a dual antenna lattice whitener for a case of two receive antennas and no oversampling.

In order to achieve rapid filter adaptation, as well as the possibility to flexibly change the length of the whitening filter 20 (i.e., the filter order), a lattice filter 40, such as the one depicted in FIG. 3, can be used to implement the whitening filters 22A–22D. The lattice filter 40 is formed from a number of lattice stages $40_0, \ldots, 40_n$, which can be adapted independently using, as an example, a LMS algorithm. The coefficients may also be directly computed using, as an example, a LMMSE criterion. When changing the number of lattice stages $40_0, \ldots, 40_n$, the filter coefficients of the remaining stages do not change.

More specifically, FIG. 3 shows an embodiment of a dual-antenna lattice whitening filter 20 for two receive antennas 20A, 20B, and with no oversampling. The triangles 42 represent multipliers, the rectangles 44 denote delay elements, and the circles containing+ symbols denote adders 46.

It should be noted that the basic lattice structures given in the literature cannot be used as such for an application that uses multiple antenna and/or oversampling. Whitening in the spatial domain, and over multiple symbol samples, is obtained by properly interconnecting the parallel lattices. Even after interconnection, some lattice structures offer only partial decorrelation of the output samples. In this case, it is possible to apply a simple additional whitener at the output of the lattice filter 40 to complete the whitening process.

The lattice filter 40 embodiment of FIG. 3 has, in general, the same number of stages as there are delay elements in FIG. 2 (plus one). The lattice filter 40 in the embodiment of FIG. 3 can be used as well with two samples per chip, but in this case the use of one receive antenna is preferred. The number of chip samples and number of antennas are equivalent in terms of structuring the whitening filter 20 in FIG. 2, i.e., the product $N_s * N_{rx}$ is what matters. Since the lattice filter 40 in FIG. 3 preferably handles only the case where $N_s * N_{rx} = 2$, the value of one of the parameters is limited to 1.

The multipliers 42 multiply the signal input to the multiplier with a factor not shown in the figure, and thus are a simplified representation. The basic principle is that the multipliers 42 are arranged such that the output of an adder 46 is a prediction error of the signal arriving at the adder 46 through a signal line 45 which does not include a multiplier 42. So in this case, each adder 46 has three inputs, two of which include a multiplier 42 and another one (signal line 45) that is the signal to be predicted by the associated lattice stage. The prediction error is the output of the adder 46. In FIG. 3 there are two lattice outputs. This lattice can be used to replace two whitening filters ($w_{i,j}$) in FIG. 2 (note that only $N_s * N_{rx} = 2$ parallel whiteners are needed because of the simplifying assumption used in FIG. 3).

Figure 4:
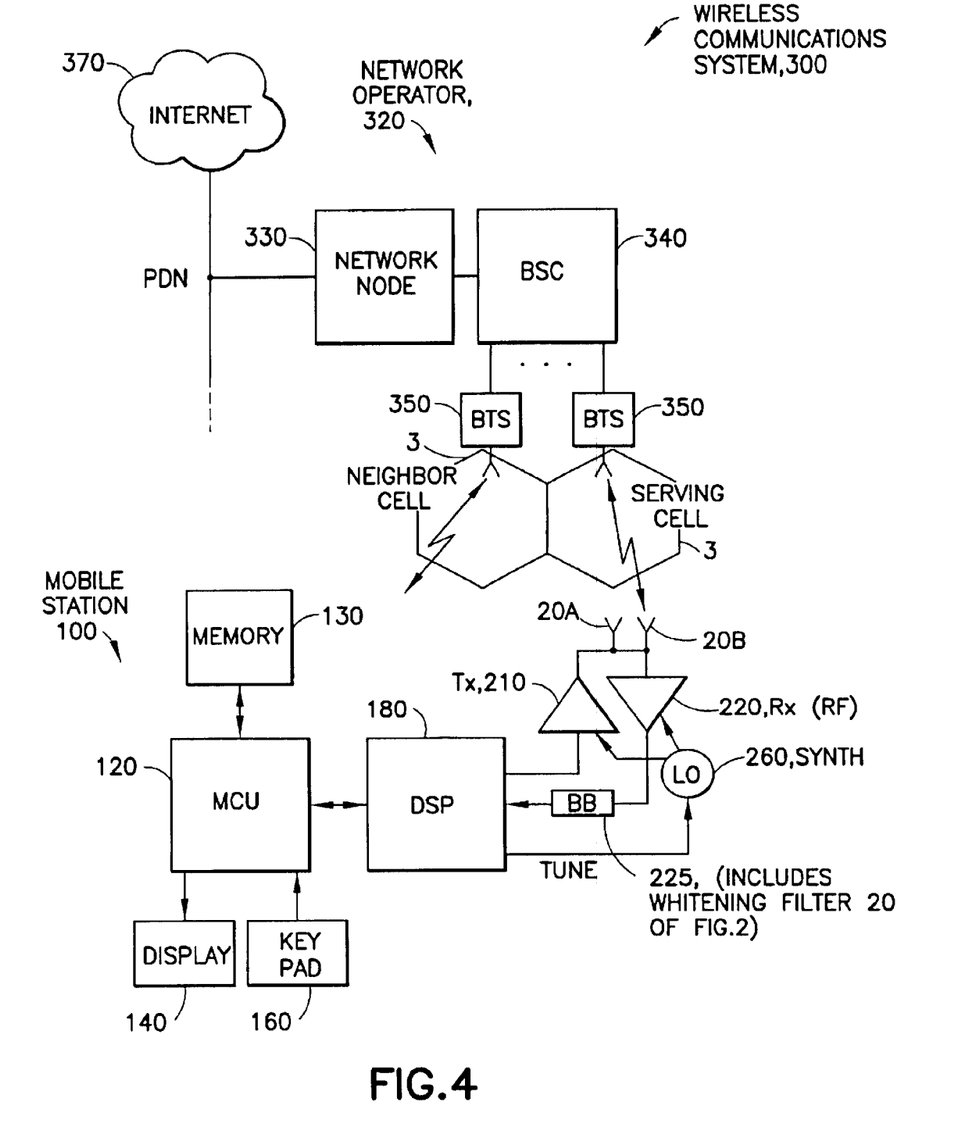
FIG. 4 is a simplified block diagram of a CDMA terminal, or mobile station, and a wireless network, where the mobile station is constructed to include the whitening receiver front end structure shown in FIG. 2.

Referring to FIG. 4, there is shown as a simplified block diagram an embodiment of a wireless communications system 300 that is suitable for practicing this invention. The wireless communications system 300 includes at least one mobile station (MS) 100. FIG. 1 also shows an exemplary network operator 320 having, for example, a node 330 for connecting to a telecommunications network, such as a Public Packet Data Network or PDN, at least one base station controller (BSC) 340 or equivalent apparatus, and a plurality of base transceiver stations (BTS) 350, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 350, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data traffic enabling Internet 370 access and web page downloads. In the presently preferred embodiment of this invention the air interface standard is compatible with a CDMA air interface standard, such as a WCDMA standard, although this is not a limitation upon the practice of this invention.

The mobile station 100 typically includes a control unit or control logic, such as a microcontrol unit (MCU) 120 having an output coupled to an input of a display 140 and an input coupled to an output of a keyboard or keypad 160.

The mobile station 100 may be a handheld radiotelephone, such as a cellular telephone or a personal communicator, or it may be contained within a card or module that is connected during use to another device. For example, the mobile station 10 could be contained within a PCMCIA or similar type of card or module that is installed during use within a portable data processor, such as a laptop or notebook computer.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. At least some of this temporary data can be stored in a data buffer 130A. The operating program is assumed to execute the software routines, layers and protocols required to provide a suitable user interface (UI), via display 140 and keypad 160, with a user, as well as all other required signal and other processing functions. Although not shown, a microphone and speaker are typically provided for enabling the user to conduct voice calls in a conventional manner.

The mobile station 100 also contains a wireless section that includes a digital signal processor (DSP) 180, or equivalent high speed processor or logic, as well as a wireless transceiver that includes an RF transmitter 200 and an RF receiver 220. In accordance with this invention, at least the receiver 220 is coupled to at least two of the antennas 20A, 20B for communication with the network operator via a BS 350, and possible a plurality of the BSs 350 during soft handoff. At least one local oscillator, such as a frequency synthesizer (SYNTH) 260, is provided for tuning the transceiver. Data, such as digitized voice and packet data, is transmitted and received through the antennas 20A, 20B.

The output of the RF receiver 220 feeds a baseband (BB) block 225 that includes, in accordance with this invention, the whitening filter 20 and the RAKE 14. Some of these functions could be performed, if desired, by software routines executed by the DSP 180, and may not be totally implemented in hardware.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of more than two antennas, and various types of RAKE filters, may be attempted by those skilled in the art.

Figure 5:
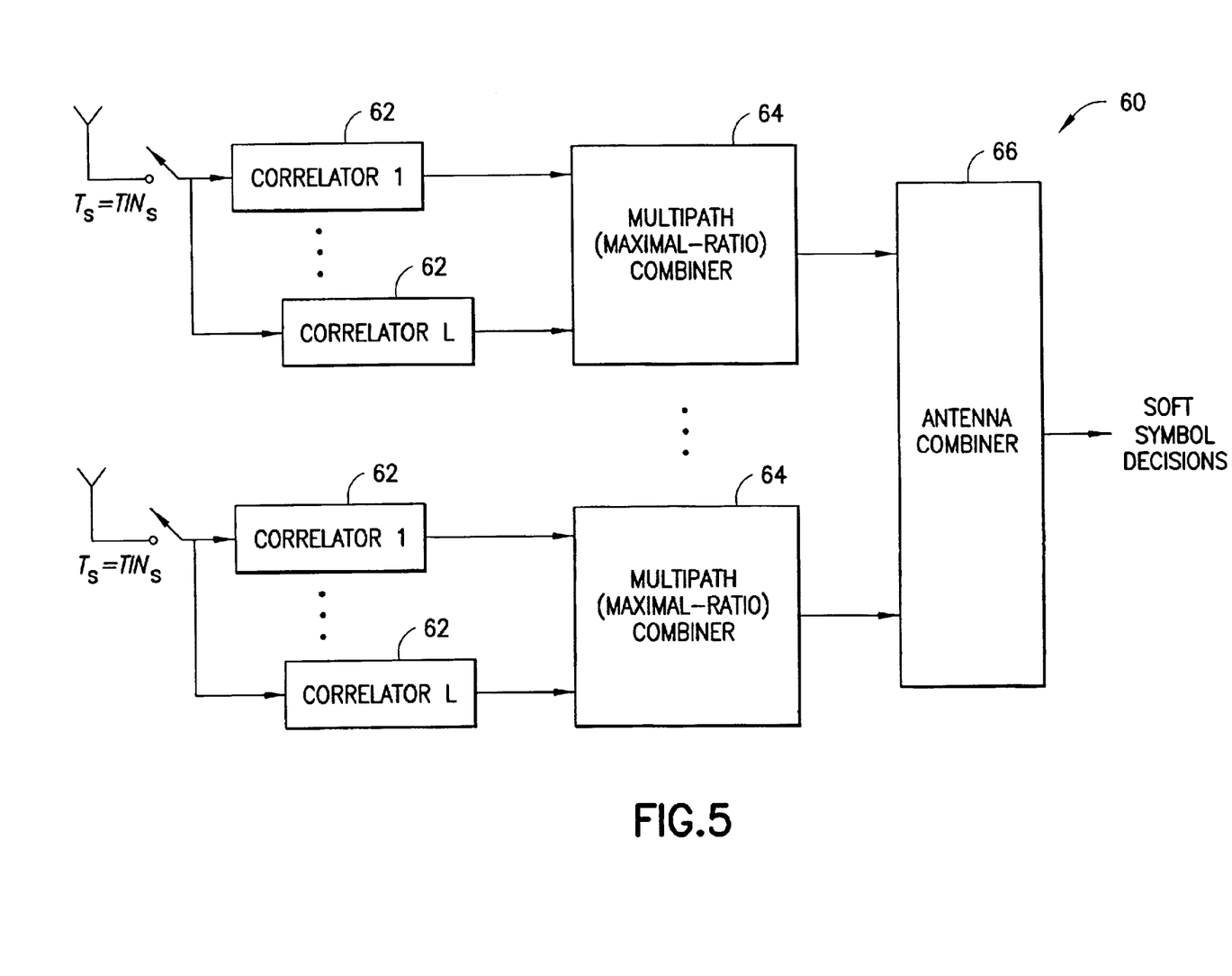
FIG. 5 is a simplified block diagram showing the baseband structure of a multi-antenna RAKE embodiment of this invention.

As an example, FIG. 5 shows the baseband structure of a multiple antenna RAKE 60 (RF components are not shown to simplify the drawing). In this case there are L multipath signals each of which is despread using a properly delayed code correlator (1-L) 62. The correlator outputs are combined in blocks 64 by weighting by the corresponding complex conjugated channel coefficients. In principle, there are as many parallel single-antenna RAKE receivers as there are receive antennas. The multipath combiner 64 outputs are further combined by an antenna combiner 66 to obtain soft symbol decisions. The antenna combiner 66 may be a simple adder, or a more advanced combiner that takes into account the interference levels in the output of each multipath combiner 64.

However, all such and similar modifications of the teachings of this invention will still fall within the scope of this invention. Further, while the method and apparatus described herein are provided with a certain degree of specificity, the present invention could be implemented with either greater or lesser specificity, depending on the needs of the user. Further, some of the features of the present invention could be used to advantage without the corresponding use of other features. As such, the foregoing description should be considered as merely illustrative of the principles of the present invention, and not in limitation thereof, as this invention is defined by the claims, which follow.

What is claimed is:

1. A code division, multiple access (CDMA) receiver, comprising a receiver input for coupling to signal outputs of $N_{rx}$ receive antennas, the signal outputs being sampled at $N_s$ samples per symbol or chip, a matched filter, and a whitening filter system for coupling the receiver input to an input of the matched filter, said whitening filter system comprising $N_s N_{rx}$ parallel individual whitening filters $w_{j,k}$, individual whitening filters $w_{j,k}$ receiving, during each symbol interval I, $N_s N_{rx}$ new signal samples via a signal connection matrix such that a first individual whitening filter receives one of the new samples, a second individual whitening filter receives the same new sample as the first individual whitening filter, and one additional new sample, and such that an nth individual whitening filter receives the same n−1 new samples as the first n−1 individual whitening filters, plus one additional new sample, said whitening filter system comprising $N_{rx}$ outputs for outputting filtered signal samples such that a filtered signal sample appearing in the $N_{rx}$ outputs does not correlate with any other filtered signal sample appearing in $N_{rx}$ outputs.

2. A CDMA receiver as in claim 1, further comprising a delay line comprised of a plurality of serially coupled delay line elements each having a delay of one symbol interval, said delay line having an input coupled to an output of said signal connection matrix and providing the $N_s N_{rx}$ parallel whitening filters $w_{j,k}$ with delayed versions of said signal samples.

3. A CDMA receiver as in claim 2, where for a symbol interval i and where $N_s N_{rx}$=4, signal vectors output from the delay line elements are defined as:

$$r(i-1) = \begin{pmatrix} r_{1,1}(i-1) \\ r_{1,2}(i-1) \\ r_{2,1}(i-1) \\ r_{2,2}(i-1) \end{pmatrix},$$

where in the term $r_{n,m}(i)$ the symbols n and m denote an antenna and a symbol sample index, respectively, where an the input signal vector for an arbitrary one of the individual whitening filters $w_{n,m}$ is denoted by $r_{n,m}$, the signal connection matrix results in input signal vectors:

$$r_{1,1}(i) = \begin{pmatrix} \vdots \\ r(i-2) \\ r(i-1) \\ r_{1,1}(i) \end{pmatrix}; r_{1,2}(i) = \begin{pmatrix} \vdots \\ r(i-2) \\ r(i-1) \\ r_{1,1}(i) \\ r_{1,2}(i) \end{pmatrix}; r_{2,1}(i) = \begin{pmatrix} \vdots \\ r(i-2) \\ r(i-1) \\ r_{1,1}(i) \\ r_{1,2}(i) \\ r_{2,1}(i) \end{pmatrix};$$

$$r_{2,2}(i) = \begin{pmatrix} \vdots \\ r(i-2) \\ r(i-1) \\ r(i) \end{pmatrix}$$

at the inputs to the individual whitening filters $w_{n,m}$.

4. A CDMA receiver as in claim 3, where in a direct form solution, taking one of the signal vectors the signal model is expressed as $$r_{n,m}(i) = Gb + n = \begin{pmatrix} H \\ h^T \end{pmatrix} b + n,$$

where $(\cdot)^T$ denotes transposition, G is a channel matrix, possibly including the effect of transmitter and receiver filters, b is a symbol vector and n a noise vector, and vector $h^T$ is the bottom row of G, the corresponding individual whitening filter $w_{n,m}$ output is $$g_{n,m}(i) = w_{n,m}{}^H(i) r_{n,m}(i),$$

where $(\cdot)^H$ denotes conjugate transposition.

5. A CDMA receiver as in claim 4, where an individual whitening filter $w_{n,m}$ is obtained by using linear minimum mean-square error (LMMSE) criterion as $$w_{n,m}(i) = \begin{pmatrix} -\alpha C_{n,m}^{-1} H h^* \\ 1 \end{pmatrix} = \begin{pmatrix} -u_{n,m} \\ 1 \end{pmatrix},$$

in which $(\cdot)^{-1}$ denotes matrix inversion and $(\cdot)^*$ complex conjugation, where symbol $\alpha$ is a real scaling factor, and the covariance matrix of $r_{n,m}(i)$ is $$C_{n,m} = \text{Expectation}\{\tilde{r}_{n,m}(i)\tilde{r}_{n,m}{}^H(i)\},$$

where the tilde above vector $r_{n,m}(i)$ denotes an operation where the bottom element of the original vector is excluded.

6. A CDMA receiver as in claim 5, where the unfixed part $u_{n,m}$ of the whitening filter is made adaptive in accordance with:

$$u_{n,m} \leftarrow u_{n,m} + \mu\{g_{n,m}{}^*(i)\tilde{r}_{n,m}(i)\},$$

where parameter $\mu$ is a step size factor.

7. A CDMA receiver as in claim 1, where said whitening filter system comprises serially coupled lattice stages that form a lattice filter.

8. A method for operating a code division, multiple access (CDMA) receiver, comprising:

coupling a receiver input to signal outputs of $N_{rx}$ receive antennas, the signal outputs being sampled at $N_s$ samples per symbol, whitening the signal outputs; and filtering the whitened signal outputs with a matched filter, where whitening uses a whitening filter system comprising $N_s N_{rx}$ parallel individual whitening filters $w_{j,k}$, individual whitening filters $w_{j,k}$ receiving during each symbol interval i, $N_s N_{rx}$ new signal samples via a signal connection matrix such that a first individual whitening filter receives only one of the new samples, a second individual whitening filter receives the same sample as the first individual whitening filter, and one additional sample, and such that an nth individual whitening filter receives the same n−1 samples as the first n−1 individual whitening filters, plus one of the remaining samples, and outputting from said whitening filter system, over $N_{rx}$ outputs, filtered signal samples such that a filtered signal sample appearing in the $N_{rx}$ outputs does not correlate with any other filtered signal sample appearing in $N_{rx}$ outputs.

9. A method as in claim 8, further comprising operating a delay line comprised of a plurality of serially coupled delay line elements each having a delay of one symbol interval, said delay line having an input coupled to an output of said signal connection matrix and providing the $N_s N_{rx}$ parallel whitening filters $w_{j,k}$ with delayed versions of said signal samples.

10. A method as in claim 9, where for a symbol interval i and where $N_s N_{rx} = 4$, signal vectors output from the delay line elements are defined as:

$$r(i-1) = \begin{pmatrix} r_{1,1}(i-1) \\ r_{1,2}(i-1) \\ r_{2,1}(i-1) \\ r_{2,2}(i-1) \end{pmatrix},$$

where in the term $r_{n,m}(i)$ the symbols n and m denote an antenna and a symbol sample index, respectively, where an the input signal vector for an arbitrary one of the individual whitening filters $w_{n,m}$ is denoted by $r_{n,m}$, the signal connection matrix results in input signal vectors:

$$r_{1,1}(i) = \begin{pmatrix} \vdots \\ r(i-2) \\ r(i-1) \\ r_{1,1}(i) \end{pmatrix}; r_{1,2}(i) = \begin{pmatrix} \vdots \\ r(i-2) \\ r(i-1) \\ r_{1,1}(i) \\ r_{1,2}(i) \end{pmatrix}; r_{2,1}(i) = \begin{pmatrix} \vdots \\ r(i-2) \\ r(i-1) \\ r_{1,1}(i) \\ r_{1,2}(i) \\ r_{2,1}(i) \end{pmatrix};$$

$$r_{2,2}(i) = \begin{pmatrix} \vdots \\ r(i-2) \\ r(i-1) \\ r(i) \end{pmatrix}$$

at the inputs to the individual whitening filters $w_{n,m}$.

11. A method as in claim 10, where in a direct form solution, taking one of the signal vectors the signal model is expressed as $$r_{n,m}(i) = Gb + n = \begin{pmatrix} H \\ h^T \end{pmatrix} b + n,$$

where $(\cdot)^T$ denotes transposition, G is a channel matrix, possibly including the effect of transmitter and receiver filters, b is a symbol vector and n a noise vector, and vector $h^T$ is the bottom row of G, the corresponding individual whitening filter $w_{n,m}$ output is $$g_{n,m}(i)=w_{n,m}^{H}(i)r_{n,m}(i),$$

where $(\cdot)^H$ denotes conjugate transposition.

12. A method as in claim 11, where an individual whitening filter $w_{n,m}$ is obtained by using linear minimum mean-square error (LMMSE) criterion as $$w_{n,m}(i) = \begin{pmatrix} -\alpha C_{n,m}^{-1} H h^* \\ 1 \end{pmatrix} = \begin{pmatrix} -u_{n,m} \\ 1 \end{pmatrix},$$

in which $(\cdot)^{-1}$ denotes matrix inversion and $(\cdot)^*$ complex conjugation, where symbol $\alpha$ is a real scaling factor, and the covariance matrix of $r_{n,m}(i)$ is $$C_{n,m}=\text{Expectation}\{\tilde{r}_{n,m}(i)\tilde{r}_{n,m}^{H}(i)\},$$

where the tilde above vector $r_{n,m}(i)$ denotes an operation where the bottom element of the original vector is excluded.

13. A method as in claim 12, where the unfixed part $u_{n,m}$ of the whitening filter is made adaptive in accordance with:

$$u_{n,m}\leftarrow u_{n,m}+\mu\{g_{n,m}^*(i)\tilde{r}_{n,m}(i)\},$$

where parameter $\mu$ is a step size factor.

14. A method as in claim 8, where said whitening filter system comprises serially coupled lattice stages that form a lattice filter.

15. A code division, multiple access (CDMA) mobile station, said mobile station comprising a receiver coupled to $N_{rx}$ receive antennas and further comprising baseband circuitry for sampling signal outputs of said $N_{rx}$ receive antennas at $N_s$ samples per symbol or chip, said baseband circuitry further comprising a multi-antenna RAKE receiver and a whitening filter system for coupling the sampled signals to inputs of said multi-antenna RAKE receiver, said whitening filter system comprising $N_s N_{rx}$ parallel individual whitening filters $w_{j,k}$, individual whitening filters $w_{j,k}$ receiving, during each symbol interval I $N_s N_{rx}$ new signal samples via a signal connection matrix such that a first individual whitening filter receives one of the new samples, a second individual whitening filter receives the same new sample as the first individual whitening filter, and one additional new sample, and such that an nth individual whitening filter receives the same n−1 new samples as the first n−1 individual whitening filters, plus one additional new sample, further comprising a delay line comprised of a plurality of serially coupled delay line elements each having a delay of one symbol interval, said delay line having an input coupled to an output of said signal connection matrix and providing the $N_s N_{rx}$ parallel individual whitening filters $w_{j,k}$ with delayed versions of said signal samples, said whitening filter system comprising $N_{rx}$ outputs for outputting whitened filtered signal samples to said multi-antenna RAKE receiver.

16. A CDMA mobile station as in claim 15, where said whitening filter and said multi-antenna RAKE receiver together comprise a linear channel equalizer.

17. A CDMA mobile station as in claim 15, where said whitening filter system and said multi-antenna RAKE receiver together comprise a multi-antenna space-time equalizer that performs beam-forming while suppressing inter-cell interference.

18. A CDMA mobile station as in claim 15, where said same whitening filter system is used for receiving transmissions from a plurality of base stations during a soft handoff procedure.

19. A CDMA mobile station as in claim 16, where said linear channel equalizer is comprised of a minimum mean-square error channel equalizer.

20. A circuit, comprising an input for coupling to signal outputs of $N_{rx}$ receive antennas, means for sampling the signal outputs at $N_s$ samples per symbol or chip, matched filter means and whitening filter means for coupling the receiver input to an input of the matched filter means, said whitening filter means comprising $N_s N_{rx}$ parallel individual whitening filters $w_{j,k}$, individual whitening filters $w_{j,k}$ receiving, during each symbol interval I, $N_s N_{rx}$ new signal samples such that a first individual whitening filter receives one of the new samples, a second individual whitening filter receives the same new sample as the first individual whitening filter, and one additional new sample, and such that an nth individual whitening filter receives the same n−1 new samples as the first n−1 individual whitening filters, plus one additional new sample, said whitening filter means comprising $N_{rx}$ outputs for outputting filtered signal samples such that a filtered signal sample appearing in the $N_{rx}$ outputs does not correlate with any other filtered signal sample appearing in $N_{rx}$ outputs.

21. A circuit as in claim 20, further comprising delay means comprised of a plurality of delay elements for providing the $N_s N_{rx}$ parallel whitening filters $w_{j,k}$ with delayed versions of said signal samples.

22. A circuit as in claim 20, where said whitening filter means comprises serially coupled lattice stages that form lattice filter means.

23. A computer program product comprising instructions operable for whitening a signal, comprising operations of:

operating on sampled signal outputs of $N_{rx}$ receive antennas, where the signal outputs are sampled at $N_s$ samples per symbol, for whitening the signal outputs, where whitening uses a whitening filter system comprising $N_s N_{rx}$ parallel whitening filters $w_{j,k}$, individual whitening filters $w_{j,k}$ receiving during each symbol interval i, $N_s N_{rx}$ new signal samples such that a first individual whitening filter receives only one of the new samples, a second individual whitening filter receives the same sample as the first individual whitening filter, and one additional sample, and such that an nth individual whitening filter receives the same n−1 samples as the first n−1 individual whitening filters, plus one of the remaining samples, and outputting from said whitening filter system, over $N_{rx}$ outputs, filtered signal samples such that a filtered signal sample appearing in the $N_{rx}$ outputs does not correlate with another filtered signal sample appearing in $N_{rx}$ outputs.

24. A computer program product as in claim 23, further comprising operations of providing the $N_s N_{rx}$ parallel whitening filters $w_{j,k}$ with delayed versions of said signal samples.

* * * * *